United States Patent
Hashimoto

(10) Patent No.: US 12,547,524 B2
(45) Date of Patent: Feb. 10, 2026

(54) CONTINUOUS UPDATE OF DRIVING SYSTEM FOR USER EXPERIENCE IMPROVEMENT

(71) Applicant: TOYOTA JIDOSHA KABUSHIKI KAISHA, Aichi-ken (JP)

(72) Inventor: Daisuke Hashimoto, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/652,786

(22) Filed: May 1, 2024

(65) Prior Publication Data
US 2025/0342103 A1    Nov. 6, 2025

(51) Int. Cl.
*G06F 11/34* (2006.01)
*G06F 40/169* (2020.01)
*H04L 51/216* (2022.01)

(52) U.S. Cl.
CPC ........ *G06F 11/3476* (2013.01); *G06F 40/169* (2020.01); *H04L 51/216* (2022.05)

(58) Field of Classification Search
CPC ... G06F 11/3476; G06F 40/169; H04L 51/216
USPC .......................................................... 714/45
See application file for complete search history.

(56) References Cited

U.S. PATENT DOCUMENTS

| | | |
|---|---|---|
| 2006/0293894 A1 | 12/2006 | Peyroux |
| 2021/0073330 A1 | 3/2021 | Inagaki et al. |
| 2021/0166105 A1* | 6/2021 | Panjwani ................. G06N 3/08 |
| 2021/0191707 A1 | 6/2021 | Ullman et al. |
| 2022/0222055 A1 | 7/2022 | Sakai |
| 2025/0013930 A1* | 1/2025 | Zhou ...................... G06N 20/20 |

* cited by examiner

*Primary Examiner* — Yair Leibovich
(74) *Attorney, Agent, or Firm* — HAUPTMAN HAM, LLP

(57) ABSTRACT

Continuous update of driving system for user experience improvement is performed by collecting a plurality of user feedback from an Internet, the plurality of user feedback identified by an identification machine-learning model to involve one or more vehicles, clustering, by a clustering machine-learning model, the plurality of user feedback into a plurality of incident clusters, and defining, by a requirement defining machine-learning model, a user experience requirement according to user feedback among the plurality of incident clusters.

9 Claims, 10 Drawing Sheets

REQUIREMENT FILE 923

REQUIREMENT IDENTIFIER 990

REQUIREMENT SUMMARY 991

TRAINING SET IDENTIFIER 992

| METRIC 994 | METRIC TYPE 995 | METRIC CRITERIA 996 | METRIC CONDITION 997 |
|---|---|---|---|
| LANE RECOGNITION | PRECISION | >= 0.80 | WEATHER== SUNNY |
| VEHICLE RECOGNITION | ACCURACY | >= 0.80 | TARGET== PASSENGER_ VEHICLE |
| AVOID DISCOMFORT | SCENE CLASS RECALL | >= 0.99 | ROAD== HIGHWAY |

*FIG. 9*

CONTINUOUS UPDATE OF DRIVING SYSTEM FOR USER EXPERIENCE IMPROVEMENT

BACKGROUND

Requirement as Code (RaC) is utilized to define the requirements of vehicle applications. RaC encompasses various types of information including requirements that define features and behavior of a vehicle application, metrics and their criteria used to ascertain whether requirements have been met, conditions under which these metrics and criteria are evaluated, and data or test scenarios used for such evaluation.

Creating an RaC file involves taking into account functional and non-functional requirements of a vehicle application and the applicable vehicle, specifications of the vehicle application, including user-valued features, edge cases to consider during testing, and any issues that have been identified for tracking with regression testing.

RaC files are used to test the vehicle applications and the machine learning models they employ to determine whether the requirements have been met, and judge whether the testing criteria have been fulfilled.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 is a schematic diagram of a requirement file, according to at least some embodiments of the subject disclosure.

DETAILED DESCRIPTION

Figure 1:
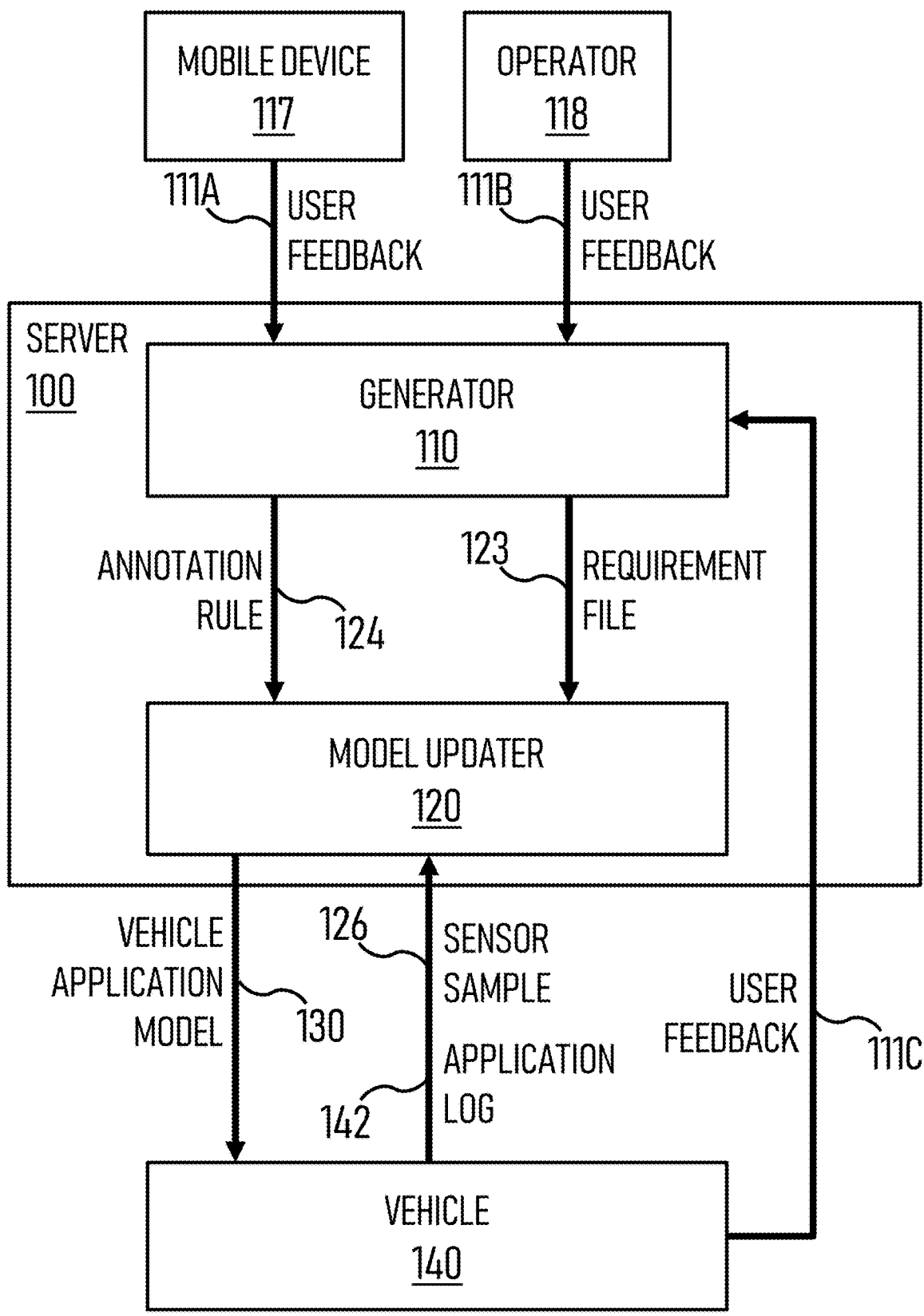
FIG. 1 is a schematic diagram of a system for continuous update of driving system for user experience improvement, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Vehicle applications and the machine learning models thereof are not always updated in a timely manner to resolve new issues, which may be in the form of challenges, weaknesses, or edge cases, because updating requires developers to be notified of new issues and to manually write requirements and design testing accordingly to resolve each issue. Even when updated, the resolution may generate discomfort for users. For example, a vehicle application configured to decelerate upon detecting vehicles ahead will apply higher deceleration force in response to later detections, i.e. when the vehicle ahead is closer, and increase the possibility of user discomfort.

In at least some embodiments of the subject disclosure, in order to update vehicle applications and the machine learning models thereof, user feedback is received about a user experience regarding the vehicle, and used as the basis for defining user experience requirements by a requirement defining machine-learning model. In at least some embodiments, each user experience requirement includes a metric type, a metric criteria, and user experience information.

By automatically generating requirements from information collected from the Internet, at least some embodiments continuously update vehicle applications and machine learning models thereof for user experience improvement without developer notification or manual input.

FIG. 1 is a schematic diagram of a system for continuous update of driving system for user experience improvement, according to at least some embodiments of the subject disclosure. The system includes a server 100, an Internet 109, and a vehicle 140.

Server 100 is in communication with mobile device 117 and operator 118 and vehicle 140, and includes generator 110, and model updater 120. In at least some embodiments, server 100 is configured to host the machine learning models and process the data for continuous update of driving system for user experience improvement. In at least some embodiments, server 100 is configured to communicate with vehicle 140 to exchange data and updates. In at least some embodiments, server 100 is configured to perform general server tasks such as data storage and network management. In at least some embodiments, server 100 is configured to connect to mobile device 117 and operator 118 for data collection and distribution. In at least some embodiments, server 100 comprises multiple physical servers and computing resources. In at least some embodiments, server 100 is a physical server in a data center or a virtual server in the cloud. In at least some embodiments, server 100 is of the type used in many fields, from web hosting to database management.

Generator 110 is configured to retrieve user feedback 112 from mobile device 117 and operator 118, and transmits requirement files, such as requirement file 123, and annotation rules, such as annotation rule 124, to model updater 120. In at least some embodiments, generator 110 is configured to generate requirement files and annotation rules from user feedback. In at least some embodiments, generator 110 is configured to generate many types of requirement files based on different types of vehicle applications and machine learning models thereof. In at least some embodiments, generator 110 is a software module running on server 100. In at least some embodiments, generator 110 is one of many servers that comprise server 100.

Model updater 120 is configured to receive requirement files, such as requirement file 123, and annotation rules, such as annotation rule 124, from generator 110, to receive sensor samples, such as sensor sample 126, and application logs, such as application log 142, from vehicle 140, and to transmit vehicle application models, such as vehicle application machine-learning model 130, to vehicle 140. In at least some embodiments, model updater 120 is configured to update vehicle application machine-learning model 130 based on training samples prepared according to the user experience requirement. In at least some embodiments, model updater 120 is configured to update other types of machine learning models. In at least some embodiments, model updater 120 is a software module running on server 100. In at least some embodiments, model updater 120 is one of many servers that comprise server 100.

Vehicle 140 is configured to receive vehicle application models, such as vehicle application machine-learning model 130, from model updater 120, to transmit sensor samples, such as sensor sample 126, and application logs, such as application log 142, to model updater 120, and to transmit user feedback, such as user feedback 112C, to generator 110. In at least some embodiments, vehicle 140 is configured to deploy an updated version of vehicle application machine-learning model 130 and generate an application log 142 based on the output of vehicle application machine-learning model 130. In at least some embodiments, vehicle 140 is configured to perform regular vehicle functions, such as transportation. In at least some embodiments, vehicle 140 is configured to interact with the physical world through sensors and actuators. In at least some embodiments, vehicle 140 is any vehicle equipped with a compatible system, such as a car, a truck, a boat, an airplane, a submarine, etc.

Mobile device 117 is in communication with server 100. In at least some embodiments, mobile device 117 is configured to serve as a user interface in the system for continuous update of driving system for user experience improvement. In at least some embodiments, mobile device 117 is configured to receive user feedback 112A about the user experience regarding vehicle 140. In at least some embodiments, mobile device 117 is configured to transmit user feedback 112A to server 100 for further processing. In at least some embodiments, mobile device 117 is configured to perform regular mobile device functions and interact with various other devices and systems. In at least some embodiments, mobile device 117 is a smartphone, tablet, or other portable computing device.

Operator 118 is in communication with server 100. In at least some embodiments, operator 118 is configured to interact with a technician or other professional in communication with a user providing user feedback. In at least some embodiments, operator 118 receives user feedback 112B about the user experience regarding vehicle 140. In at least some embodiments, operator 118 transmits user feedback 112B to server 100 for further processing. In at least some embodiments, operator 118 is configured to interact with other systems and personnel within an organization for providing service or maintenance for vehicle 140, such as a car dealer, a vehicle support center, etc. In at least some embodiments, generator 110 is configured to give suggestions through operator 118 to efficiently communicate with a user.

Figure 2:
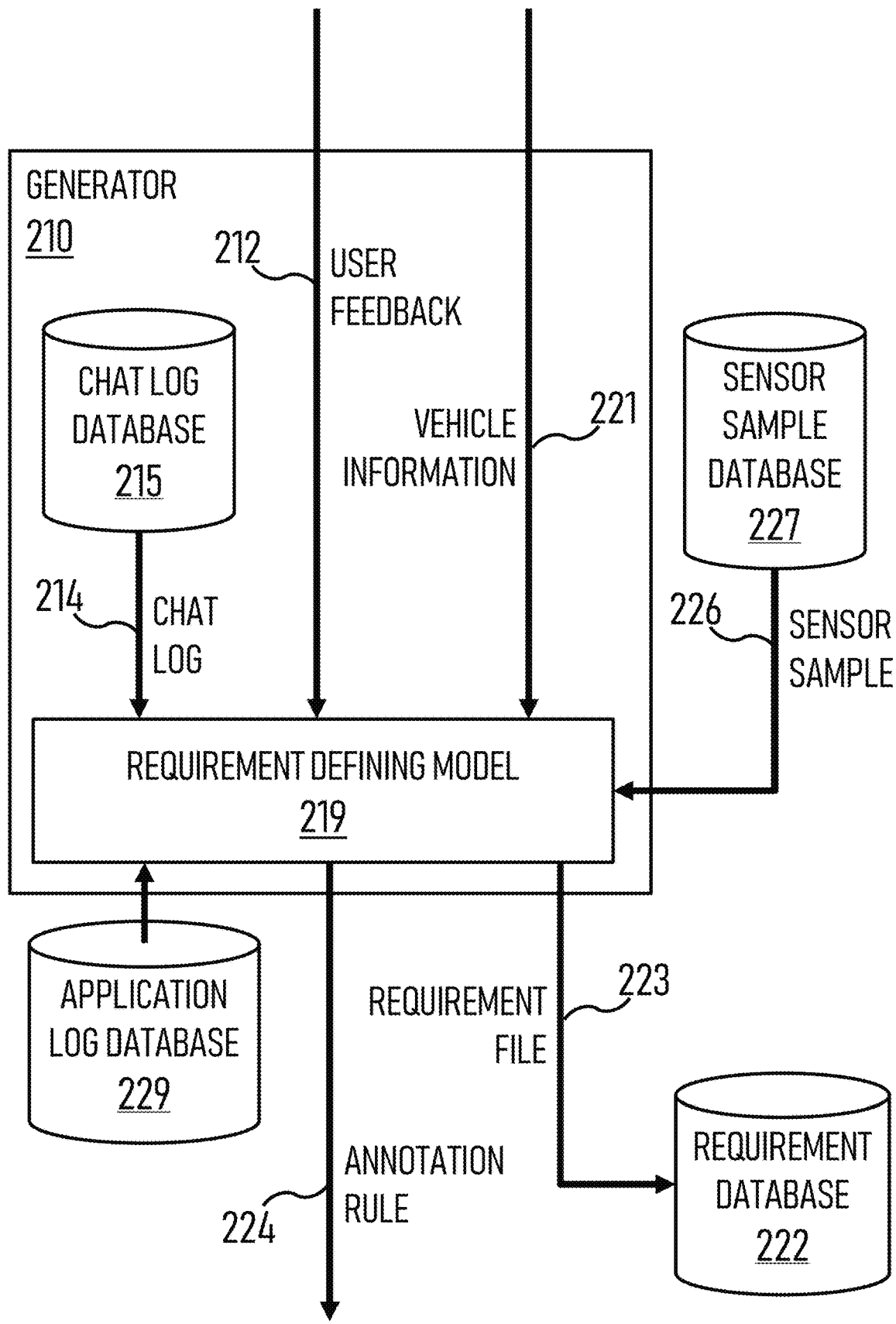
FIG. 2 is a schematic diagram of a generator, according to at least some embodiments of the subject disclosure.

FIG. 2 is a schematic diagram of a generator, according to at least some embodiments of the subject disclosure. Generator 210 includes chat log database 215, and requirement defining model 219. Generator 210 is substantially similar in structure and function to generator 110 of FIG. 1, except where described otherwise.

Chat log database 215 is configured to receive chat logs, such as chat log 214, from a vehicle and to transmit chat logs to requirement defining model 219. In at least some embodiments, chat log database 215 is configured to store the chat logs generated by the vehicle. In at least some embodiments, chat log database 215 is configured to store other types of data. In at least some embodiments, chat log database 215 is a file system, a relational database, a NoSQL database, etc. In at least some embodiments, chat log database 215 is of the type used in many fields, such as data analysis and web development.

Requirement defining model 219 is configured to receive user feedback, such as user feedback 212, sensor samples, such as sensor sample 226, from sensor sample database 227, chat logs, such as chat log 214, from chat log database 215, vehicle information 221, and application logs from application log database 229, and to transmit user experience requirements to requirement database 222. In at least some embodiments, requirement defining model 219 is configured to define user experience requirements, such as in requirement file 223, according to user feedback and vehicle information. In at least some embodiments, requirement defining model 219 is configured to define user experience requirements, such as in requirement file 223, according to user feedback, sensor samples, chat logs, vehicle information, and application logs. In at least some embodiments, requirement defining model 219 is configured to process user feedback, sensor samples, the application logs stored in application log database 229, and the chat logs stored in chat log database 215. In at least some embodiments, the sensor samples and the application logs with which requirement defining model 219 defines user experience requirements are recorded by a vehicle, such as vehicle 140, prior to the receiving the user feedback. In at least some embodiments, requirement defining model 219 is configured to define user experience requirements for many types of vehicle applications. In at least some embodiments, requirement defining model 219 is a machine learning model trained to perform a task of RaC defining. In at least some embodiments, requirement defining model 219 is configured to define rules, such as annotation rule 224, for annotating sensor samples for use as training samples.

Vehicle information 221 is utilized by requirement defining model 219. In at least some embodiments, vehicle information 221 is utilized by requirement defining model 219 to tailor user experience requirements to a specific vehicle or type of vehicles. In at least some embodiments, vehicle information 221 includes a specification of the vehicle application, a design document of the vehicle application, a source code of the vehicle application, or any combination thereof. In at least some embodiments, vehicle information 221 is configured to provide information about the vehicle for which the user experience requirement is being developed. In at least some embodiments, vehicle information 221 is configured to provide information about many types of vehicles. In at least some embodiments, vehicle information 221 is a database or a file containing the vehicle specifications in real-world forms. In at least some embodiments, vehicle information is of the type used in many fields, such as automotive engineering and vehicle manufacturing.

Requirement database 222 is configured to receive user experience requirements from requirement defining model 219. In at least some embodiments, requirement database 222 is configured to store the user experience requirements defined by requirement defining model 219. In at least some embodiments, requirement database 222 is configured to provide these requirements to other components for processing. In at least some embodiments, requirement database 222 is configured to store user experience requirements for many types of vehicle applications. In at least some embodiments, requirement database 222 is a file system, a relational database, a NoSQL database, etc.

Requirement file 223 is generated by requirement defining model 219. In at least some embodiments, requirement file 223 is configured to contain the user experience requirement in a computer-readable format. In at least some embodiments, requirement file 223 is used by other components to understand the user experience requirement. In at least some embodiments, requirement file 223 is a text file, a JSON file, an XML file, etc. In at least some embodiments, requirement file 223 is an RaC file, such as those used in software development and project management.

Annotation rule 224 is generated by requirement defining model 219. In at least some embodiments, annotation rule 224 is used to label training samples. In at least some embodiments, annotation rule 224 is a set of rules defined in a programming language.

Sensor sample 226 is a sample of data collected from a sensor. In at least some embodiments, sensor sample 226 is a sample of data collected from a sensor of a vehicle. In at least some embodiments, sensor sample 226 is collected to supplement user feedback. In at least some embodiments, sensor sample 226 was recorded during an event referred to in the user feedback. In at least some embodiments, sensor sample 226 is in the form of a value, a string, an image, a video, an audio clip, or any other digital format produced by a sensor.

Sensor sample database 227 stores and provides sensor samples, such as sensor sample 226. In at least some embodiments, sensor sample database 227 is configured to store any type of data samples. In at least some embodiments, sensor sample database 227 provides other components with sensor samples.

Application log database 229 is in communication with requirement defining model 219. In at least some embodiments, application log database 229 is configured to store output application logs of the vehicle application machine-learning model. In at least some embodiments, application log database 229 is configured to receive application logs from the vehicle. In at least some embodiments, application log database 229 is configured to provide application logs to requirement defining model 219. In at least some embodiments, the application logs provided to requirement defining model 219 were recorded during an event referred to in the user feedback. In at least some embodiments, application log database 229 is configured to store other types of logs. In at least some embodiments, application log database 229 is configured to interact with and provide application logs to other components. In at least some embodiments, application log database 229 is a file system, a relational database, a NoSQL database, etc.

Figure 3:
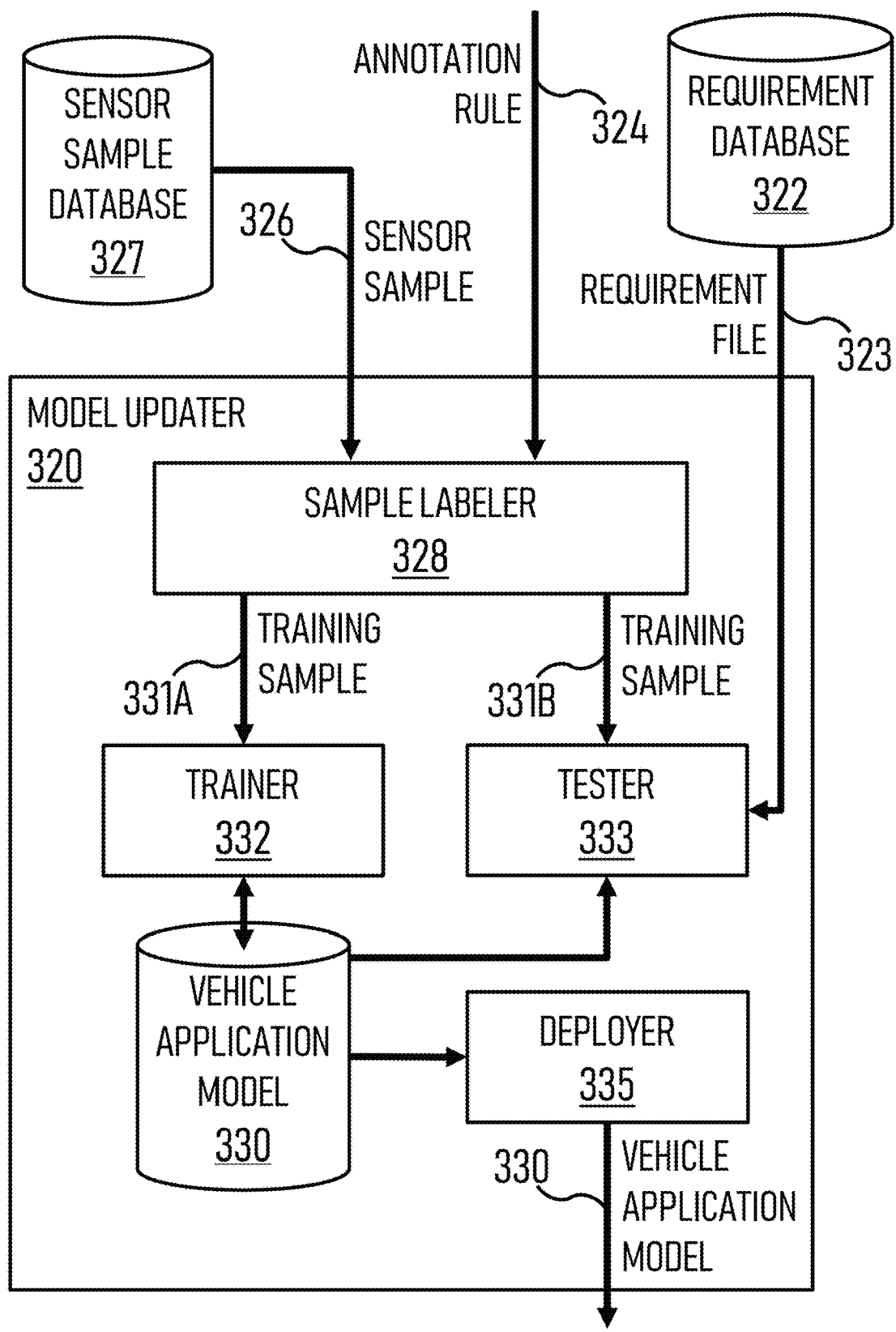
FIG. 3 is a schematic diagram of a model updater, according to at least some embodiments of the subject disclosure.

FIG. 3 is a schematic diagram of a model updater, according to at least some embodiments of the subject disclosure. Model updater 320 includes sample labeler 328, vehicle application model 330, training sample 331, trainer 332, tester 333, and deployer 335. Model updater 320 is substantially similar in structure and function to model updater 130 of FIG. 1, except where described otherwise. Requirement database 322, requirement file 323, annotation rule 324, sensor sample 326, and sensor sample database 327 are each substantially similar in structure and function to requirement database 222, requirement file 223, annotation rule 224, sensor sample 226, and sensor sample database 227 of FIG. 2, respectively, except where described otherwise.

Sensor sample 326 is a sample of data collected from a sensor. In at least some embodiments, sensor sample 326 is a sample of data collected from a sensor of a vehicle. In at least some embodiments, sensor sample 326 is labeled by sample labeler 328 to become a training sample. In at least some embodiments, sensor sample 326 is in the form of a value, a string, an image, a video, an audio clip, or any other digital format produced by a sensor.

Sensor sample database 327 stores and provides sensor samples, such as sensor sample 326. In at least some embodiments, sensor sample database 327 is configured to store any type of data samples. In at least some embodiments, sensor sample database 327 provides other components with sensor samples.

Sample labeler 328 is configured to receive sensor samples from the sensor sample database 327 and annotation rule 324, and to provide training samples to trainer 332 and tester 333. In at least some embodiments, sample labeler 328 applies the annotation rule 324 to sensor samples, and provides labeled samples, such as training samples 331A and 331B, to trainer 332 and tester 333, respectively. In at least some embodiments, sample labeler 328 is configured to label sensor samples according to annotation rule 324. In at least some embodiments, sample labeler 328 is configured to label any type of data samples. In at least some embodiments, sample labeler 328 determines which training samples are used for training and which are used for testing. In at least some embodiments, sample labeler 328 is a software module within model updater 320. In at least some embodiments, sample labeler 328 is of the type used in any system that employs supervised machine learning.

Vehicle application machine-learning model 330 is a machine learning model for the vehicle application. In at least some embodiments, vehicle application machine-learning model 330 is trained or updated with training samples, such as training sample 331A. In at least some embodiments, vehicle application machine-learning model 330 is one of many types of autonomous driving models, such as an image classification model, etc. In at least some embodiments, vehicle application machine-learning model 330 is a data structure that encapsulates the parameters of the machine learning model. In at least some embodiments, vehicle application machine-learning model 330 is for one among many types of vehicle applications, such as an automated driving application, an Advanced Driver Assistance System (ADAS) application, an infotainment application, a navigation application, etc.

Trainer 332 is configured to receive training samples, such as training sample 331A, from sample labeler 328, and to train vehicle application machine-learning model 330. In at least some embodiments, trainer 332 is configured to train the vehicle application machine learning model with a portion of the training samples. In at least some embodiments, trainer 332 is configured to update vehicle application machine-learning model 330. In at least some embodiments, trainer 332 is not limited to training vehicle application machine-learning models. In at least some embodiments, trainer 332 is configured to train any machine learning model using supervised training. In at least some embodiments, trainer 332 stores iterations of vehicle application model 330 during training. In at least some embodiments, trainer 332 is a software module within model updater 320.

Tester 333 is configured to receive testing samples, such as training sample 331B, from sample labeler 328. In at least some embodiments, tester 333 is configured to apply the vehicle application machine-learning model 330 to the training samples. In at least some embodiments, tester 333 is configured to test the vehicle application machine learning model with a portion of the training samples. In at least some embodiments, tester 333 is not limited to vehicle application machine learning models. In at least some embodiments, tester 333 is a software module within model updater 320.

Deployer 335 is in communication with vehicle application machine-learning model 330 and the vehicle. In at least some embodiments, deployer 335 is configured to deploy the vehicle application machine learning model to the vehicle. In at least some embodiments, deployer 335 is configured to receive vehicle application machine-learning model 330. In at least some embodiments, deployer 335 deploys vehicle application machine-learning model 330 in response to validation by tester 333. In at least some embodiments, deployer 335 is a software module within model updater 320.

Figure 4:
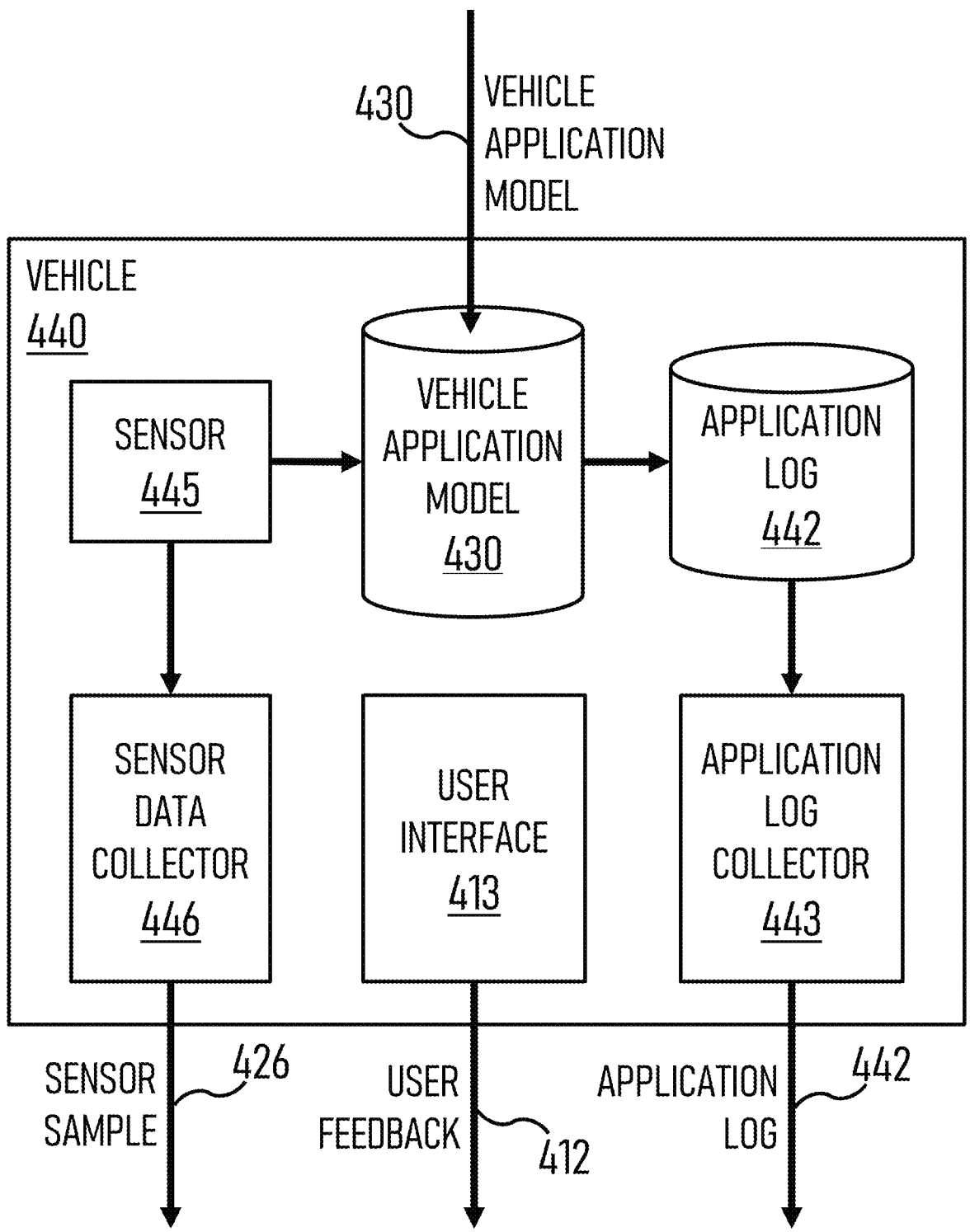
FIG. 4 is a schematic diagram of a vehicle, according to at least some embodiments of the subject disclosure.

FIG. 4 is a schematic diagram of a vehicle, according to at least some embodiments of the subject disclosure. Vehicle 440 includes user interface 413, vehicle application model 430, application log 442, application log collector 443, sensor 445, and sensor sample collector 446. Vehicle 440 is substantially similar in structure and function to vehicle 140 of FIG. 1, except where described otherwise. Vehicle application machine-learning model 430 and sensor sample 426 are each substantially similar in structure and function to vehicle application machine-learning model 330 and sensor sample 326 of FIG. 3, respectively, except where described otherwise.

User interface 413 is configured to transmit user feedback, such as user feedback 412. In at least some embodiments, user interface 413 is configured to receive user feedback about the user experience regarding vehicle 440. In at least some embodiments, user interface 413 includes a chat interface through which a generator communicates with a user to clarify a point of the user feedback. In at least some embodiments, user interface 413 interacts with vehicle application machine-learning model 430. In at least some embodiments, user interface 413 interacts with sensor sample collector 446. In at least some embodiments, user interface 413 is configured to receive user feedback. In at least some embodiments, user interface 413 communicates this feedback to a model updater for further processing. In at least some embodiments, user interface 413 is embedded in vehicle 440. In at least some embodiments, user interface 413 takes one of many various forms suitable for a vehicle. In at least some embodiments, user interface 413 includes a touchscreen interface. In at least some embodiments, user interface 413 includes a voice command system. In at least some embodiments, user interface 413 comprises physical buttons and knobs.

Application log 442 is an output log of vehicle application machine-learning model 430. In at least some embodiments, application log 442 includes sequential output of inferences performed by vehicle application model 430. In at least some embodiments, application log 442 is populated with image classification results. In at least some embodiments, application log 442 is a text file, a CSV file, etc.

Application log collector 443 is configured to receive application logs, such as application log 442. In at least some embodiments, application log collector 443 is configured to collect application logs output from vehicle application machine-learning model 430. In at least some embodiments, application log collector 443 is configured to interact with vehicle application machine-learning model 430 to facilitate collection. In at least some embodiments, application log collector 443 is a software component of vehicle 440.

Sensor 445 is configured to transmit sensor samples to vehicle application model 430 and sensor data collector 446. In at least some embodiments, sensor 445 is configured to convert real-world stimuli into digital signals and data. In at least some embodiments, sensor 445 is configured to collect real-time data about the vehicle's surroundings. In at least some embodiments, sensor 445 is one of many sensors included in vehicle 440. In at least some embodiments, sensor 445 is a camera, LiDAR, radar, microphone, GPS sensor, accelerometer, thermometer, barometer, etc.

Sensor sample collector 446 is in communication with sensor 445. In at least some embodiments, sensor sample collector 446 is configured to collect sensor samples, such as sensor sample 426, from sensor 445. In at least some embodiments, sensor sample collector 446 is configured to interact with sensor 445. In at least some embodiments, sensor sample collector 446 is also configured to interact with vehicle application machine-learning model 430 to qualify the collected sensor samples. In at least some embodiments, sensor sample collector 446 is a software component within vehicle 440.

Figure 5:
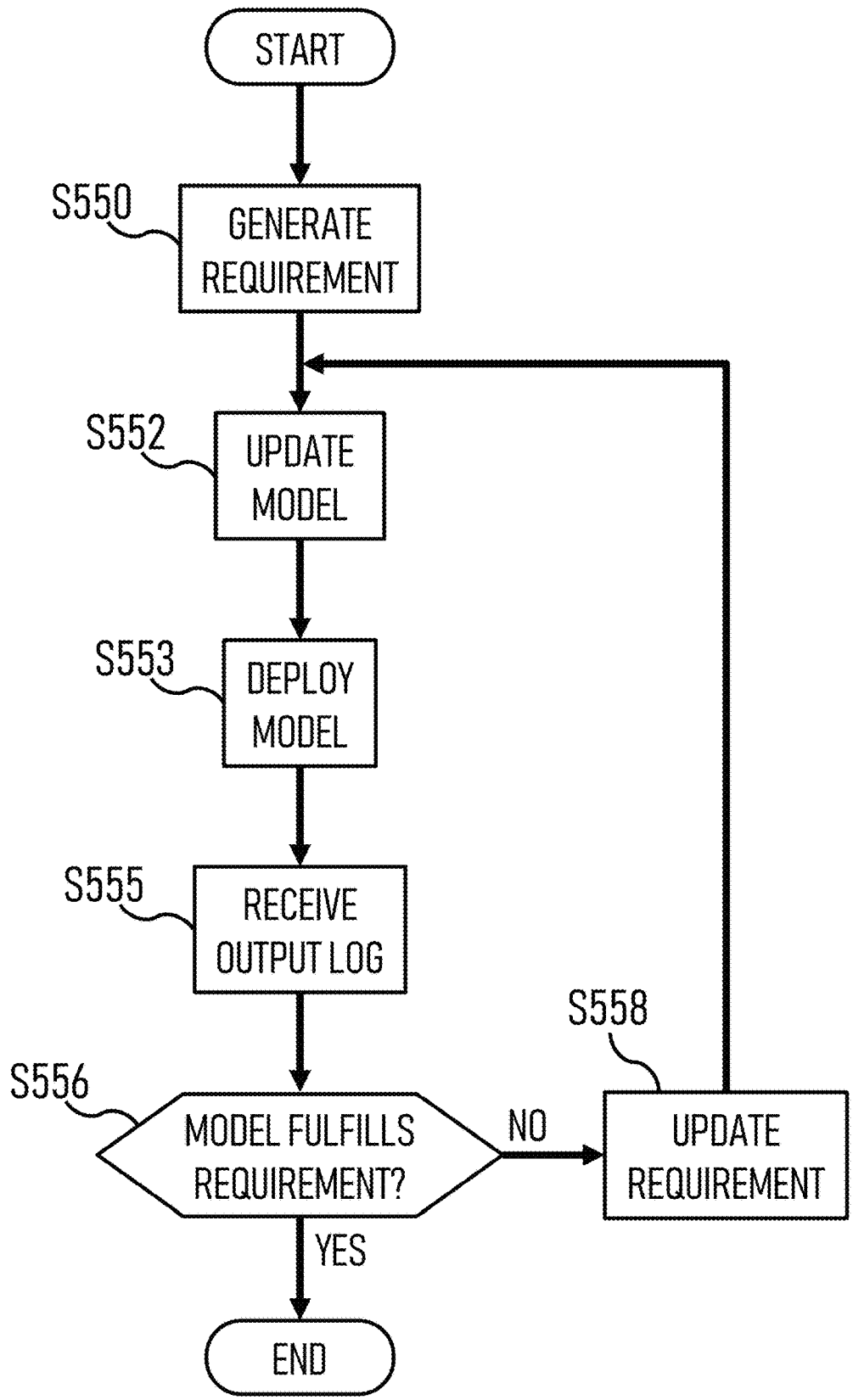
FIG. 5 is an operational flow for continuous update of driving system for user experience improvement, according to at least some embodiments of the subject disclosure.

FIG. 5 is an operational flow for continuous update of driving system for user experience improvement, according to at least some embodiments of the subject disclosure. In at least some embodiments, the operational flow provides a method of continuous update of driving system for user experience improvement, according to at least some embodiments of the subject disclosure. In at least some embodiments, the method is performed by a controller of a server, such as controller 1002 of server 1000 of FIG. 10, described hereinafter.

At S550, the controller or a section thereof generates a user experience requirement. In at least some embodiments, the controller directs a requirement defining machine-learning model to define a user experience requirement based on user feedback. In at least some embodiments, the result of this operation by the controller is a defined user experience requirement. In at least some embodiments, the controller performs this operation to set a standard that the vehicle application machine-learning model will be trained to meet. In at least some embodiments, the controller performs the operational flow of FIG. 6, explained hereinafter.

At S552, the controller or a section thereof updates a vehicle application machine-learning model. In at least some embodiments, the controller trains the vehicle application machine-learning model to meet the generated user experience requirement. In at least some embodiments, the result of this operation by the controller is an updated version of the vehicle application machine-learning model. In at least some embodiments, the controller performs this operation to improve the performance of the vehicle application machine-learning model based on the latest incidents. In at least some embodiments, the controller performs the operational flow of FIG. 7, explained hereinafter.

At S553, the controller or a section thereof deploys the updated model. In at least some embodiments, the controller deploys the vehicle application machine-learning model to a vehicle. In at least some embodiments, in response to this deployment, the controller directs the vehicle to start using the updated version of the vehicle application machine-learning model. In at least some embodiments, this operation by the controller is performed only if the vehicle application machine-learning model fulfills the user experience requirement. In at least some embodiments, the controller performs this operation so that the vehicle system can benefit from the improvements made to the model.

At S555, the controller or a section thereof receives an output log. In at least some embodiments, the controller receives an output log of the vehicle application machine-learning model from the vehicle. In at least some embodiments, in response to receiving the output log, the controller analyzes the output log to validate the vehicle application machine-learning model. In at least some embodiments, this operation requires deployment of the vehicle application machine-learning model to the vehicle.

At S556, the controller or a section thereof determines whether the vehicle application machine-learning model fulfills the user experience requirement. In response to the vehicle application machine-learning model not fulfilling the user experience requirement, the operational flow proceeds to update the requirement at S558. In response to the vehicle application machine-learning model fulfilling the user experience requirement, the operational flow ends. In at least some embodiments, the controller performs this operation to verify that the vehicle application machine-learning model continues to fulfill the user experience requirement even after deployment.

At S558, the controller updates the user experience requirement. After updating the requirement, the operational flow returns to update the model at S552. In at least some embodiments, the controller updates the user experience requirement according to a result of application log analysis. In at least some embodiments, in response to updating the requirement, the controller updates the vehicle application machine-learning model again based on the updated requirement.

Figure 6:
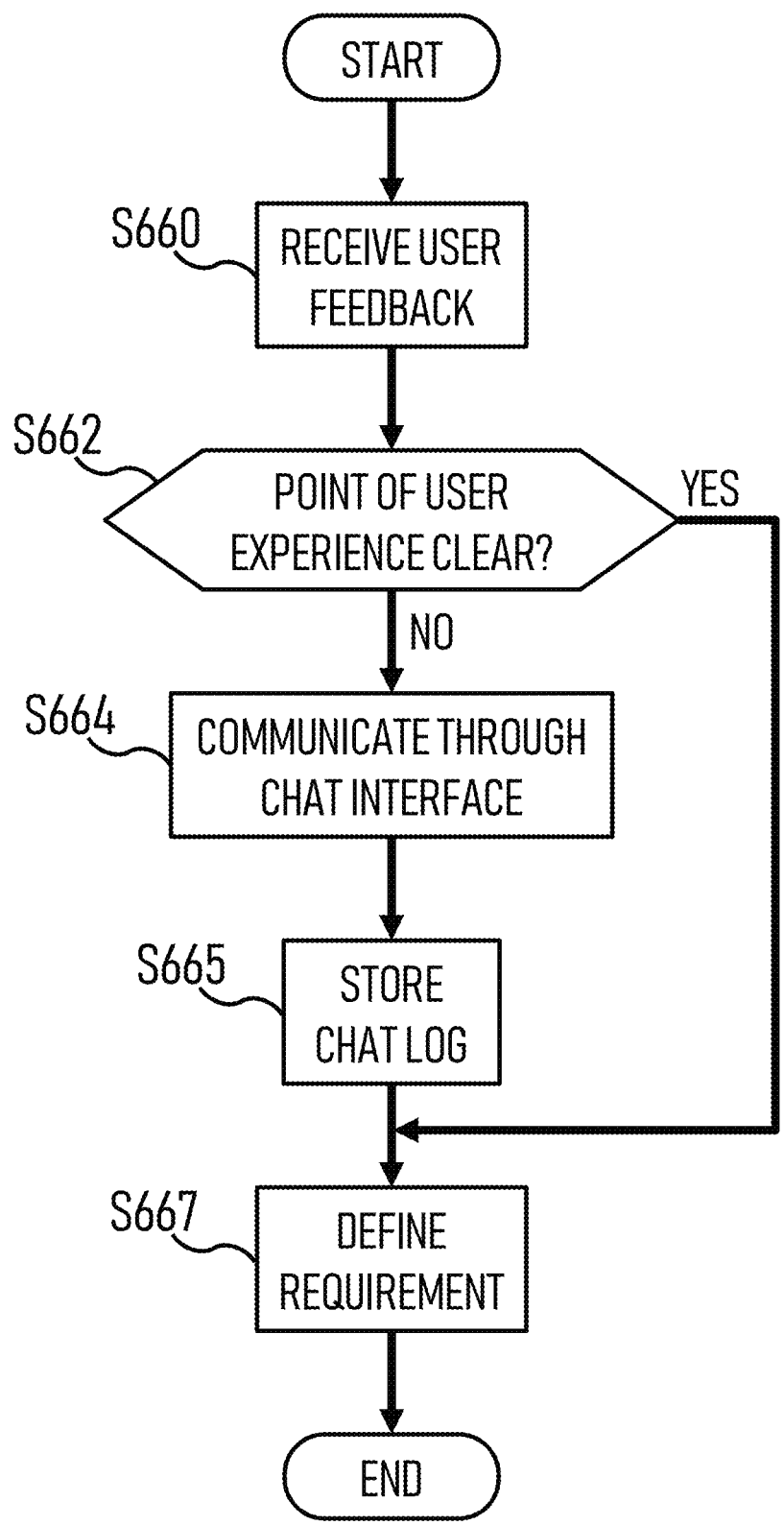
FIG. 6 is an operational flow for requirement generation, according to at least some embodiments of the subject disclosure.

FIG. 6 is an operational flow for requirement generation, according to at least some embodiments of the subject disclosure. In at least some embodiments, the operational flow provides a method of requirement generation, according to at least some embodiments of the subject disclosure. In at least some embodiments, the method is performed by a controller of a server, such as controller 1002 of server 1000 of FIG. 10, described hereinafter.

At S660, the controller receives user feedback. In at least some embodiments, the controller receives user feedback about their experience with the vehicle system through a user interface. In at least some embodiments, the user feedback reflects on the user experience and articulates the user's thoughts. In at least some embodiments, the controller receives sensor samples, application logs, or both, to supplement the user feedback. In at least some embodiments, the sensor samples and the application logs are recorded by the vehicle system prior to receiving the user feedback. In at least some embodiments, the sensor samples and the application logs were recorded during an event referred to in the user feedback. In at least some embodiments, the user is or has been a driver or a passenger of the vehicle system.

At S662, the controller determines whether the point of the user feedback is clear. In response to the user feedback not being clear, the operational flow proceeds to communicate through chat interface at S664. In response to the user feedback being clear, the operational flow proceeds to define user experience requirement at S667. In at least some embodiments, the controller assesses whether the received user feedback is clear and specific enough to define a user experience requirement. In at least some embodiments, the controller determines whether further communication with the user will be beneficial for accurately defining a user experience requirement.

At S664, the controller communicates with the user through a chat interface. In at least some embodiments, the controller engages the user in a chat conversation to gather more detailed feedback when the user feedback is not clear. In at least some embodiments, the controller identifies a root cause of a bad user experience according to an interactive chat by asking appropriate questions, giving suggestions to the user, providing a conversation context in which the user is comfortable speaking, etc. In at least some embodiments, in response to the controller's prompts, the user provides more detailed feedback. In at least some embodiments, the controller obtains more detailed user feedback. In at least some embodiments, the controller continues the chat until sufficient and clear user feedback to define a user experience requirement has been obtained.

At S665, the controller stores the chat log. In at least some embodiments, the controller stores the chat log of the conversation with the user. In at least some embodiments, the controller stores the chat log for future reference and analysis. In at least some embodiments, storing the chat log allows the controller or a generator to revisit the user feedback and understand the user experience better.

At S667, the controller defines the user experience requirement. In at least some embodiments, the controller defines a user experience requirement based on the user feedback. In at least some embodiments, the user experience requirement includes a metric type, a metric criterion, and information about the user experience. In at least some embodiments, the defined user experience requirement guides subsequent operations of preparing training samples, training, testing, and updating the vehicle application machine-learning model.

Figure 7:
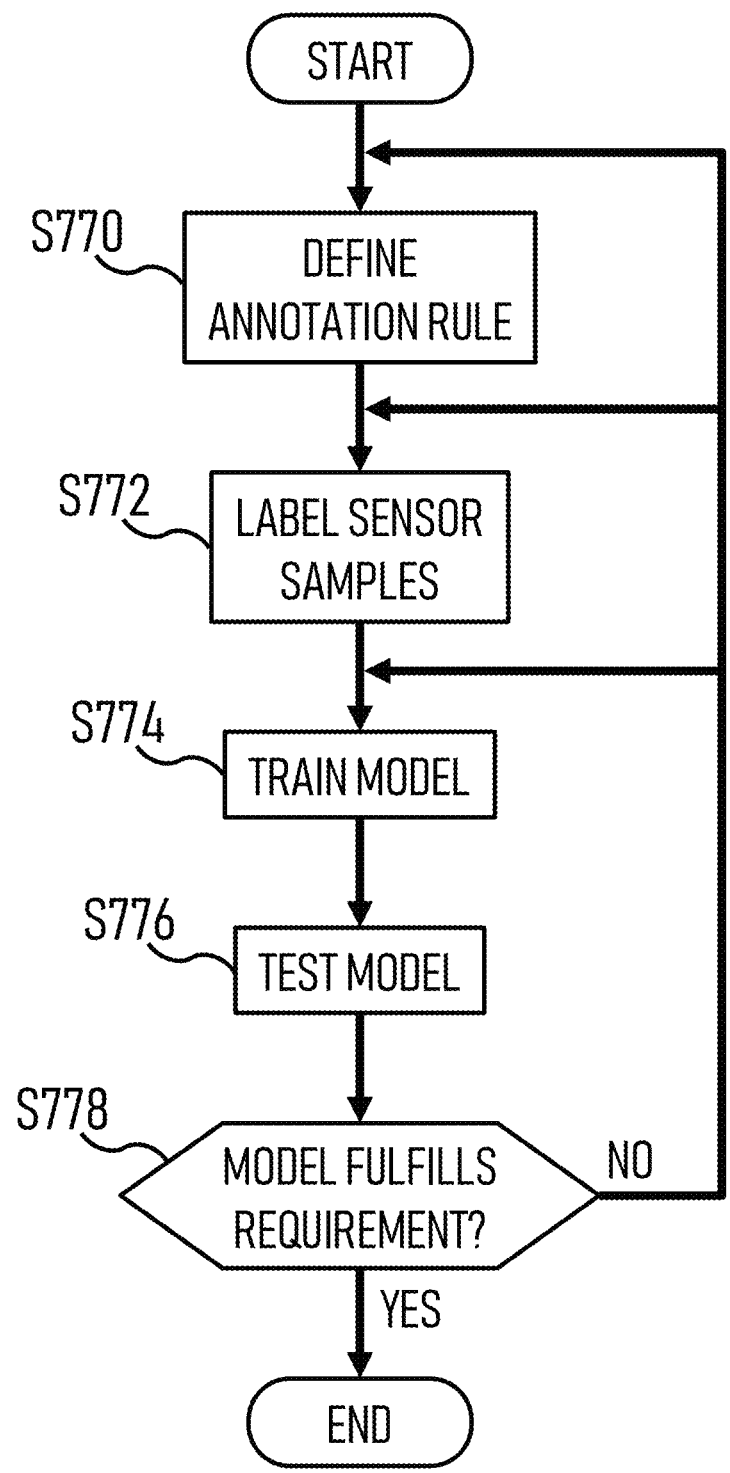
FIG. 7 is an operational flow for model training, according to at least some embodiments of the subject disclosure.

FIG. 7 is an operational flow for model training, according to at least some embodiments of the subject disclosure. In at least some embodiments, the operational flow provides a method of model training, according to at least some embodiments of the subject disclosure. In at least some embodiments, the method is performed by a controller of a server, such as controller 1002 of server 1000 of FIG. 10, described hereinafter.

At S770, the controller or a section thereof defines annotation rules. In at least some embodiments, the controller creates a set of guidelines or rules. In at least some embodiments, these rules determine how sensor samples should be labeled or annotated. In at least some embodiments, the controller utilizes the requirement defining machine-learning model to produce the annotation rule for annotating sensor samples for supervised training to comply with the user experience requirement. In at least some embodiments, the controller defines the annotation rules for consistent and accurate labeling of sensor samples.

At S772, the controller or a section thereof labels sensor samples. In at least some embodiments, the controller applies one or more annotation rules for annotating sensor samples for supervised training to comply with the user experience requirement. In at least some embodiments, the controller retrieves available sensor samples from a sensor sample database. In at least some embodiments, the controller produces a training set of labeled sensor samples based on the annotation rule. In at least some embodiments, the annotation rule enables the controller to produce training samples without human intervention.

At S774, the controller or a section thereof trains the model. In at least some embodiments, the controller trains the vehicle application machine learning model. In at least some embodiments, the controller adjusts weights and biases of the vehicle application machine learning model in response to correct or incorrect output. In at least some embodiments, the controller uses a portion of the labeled sensor samples for training. In at least some embodiments, the controller divides a set of training samples into a portion used for training and a portion used for testing. In at least some embodiments, the controller performs several iterations of training to produce a trained machine learning model.

At S776, the controller or a section thereof tests the model. In at least some embodiments, the controller tests the trained vehicle application machine learning model. In at least some embodiments, the controller uses a different portion of the labeled sensor samples for testing. In at least some embodiments, the controller applies the model to training samples within the scope of a metric condition specified in a requirement file of the user experience requirement. In at least some embodiments, the controller evaluates the performance of the vehicle application machine learning model. In at least some embodiments, the controller produces a performance evaluation of the vehicle application machine learning model.

At S778, the controller or a section thereof determines whether the model fulfills the requirement. In response to the model not fulfilling the requirement, the operational flow returns to one of training the model at S774, labeling sensor samples at S772, and defining annotation rules at S770. In response to the model fulfilling the requirement, the operational flow ends. In at least some embodiments, the controller determines whether performance of the vehicle application machine learning model meets the user experience requirement. In at least some embodiments, the controller determines whether the model fulfills the metric criteria specified in a requirement file of the user experience requirement. In at least some embodiments, in response to the vehicle application machine learning model fulfilling the user experience requirement, the controller deploys the vehicle application machine learning model. In at least some embodiments, in response to the vehicle application machine learning model not fulfilling the requirement, the controller determines whether to modify the user experience requirement, prepare more training samples, or retrain the vehicle application machine learning model.

Figure 8:
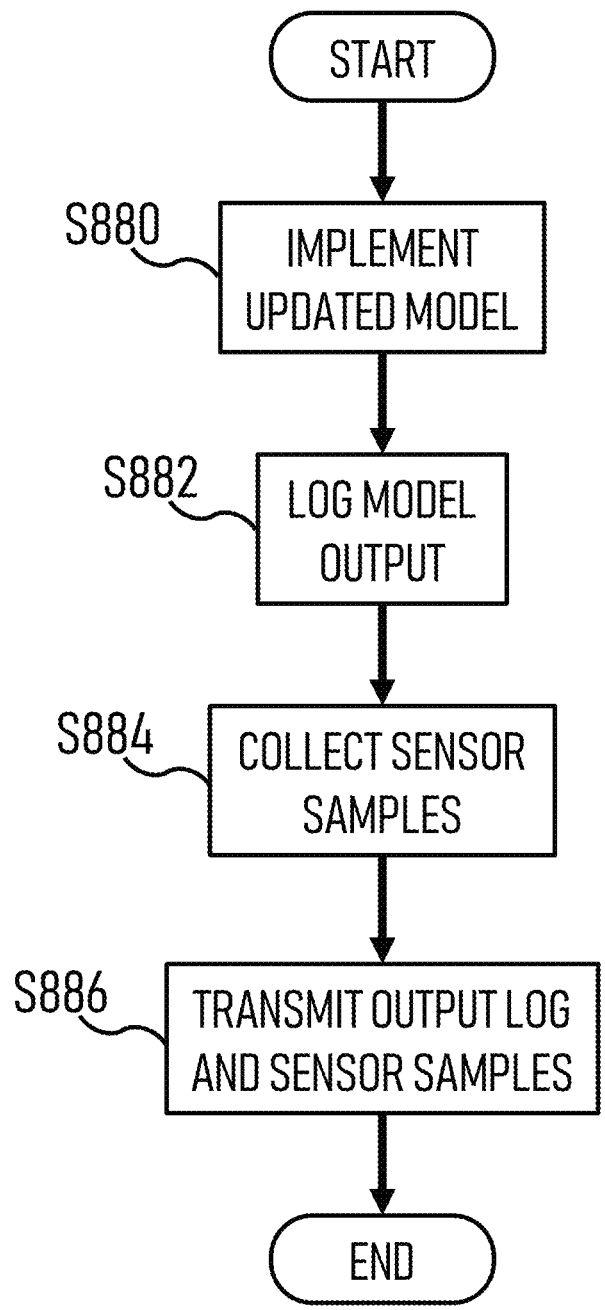
FIG. 8 is an operational flow for vehicle operation, according to at least some embodiments of the subject disclosure.

FIG. 8 is an operational flow for vehicle operation, according to at least some embodiments of the subject disclosure. In at least some embodiments, the operational flow provides a method of vehicle operation, according to at least some embodiments of the subject disclosure. In at least some embodiments, the method is performed by a controller of a vehicle, such as an electronic controller unit (ECU) of vehicle 1040 of FIG. 10, described hereinafter.

At S880, the controller implements the updated model. In at least some embodiments, the controller implements the updated version of the vehicle application machine-learning model. In at least some embodiments, the controller initiates the use of the updated model in the vehicle. In at least some embodiments, the vehicle starts using the updated model for live operations. In at least some embodiments, the controller causes the vehicle to use the most recent and accurate version of the vehicle application machine-learning model.

At S882, the controller logs the model output. In at least some embodiments, the controller records applications log of the output of the vehicle application machine-learning model. In at least some embodiments, the log can be used for analysis and validation.

At S884, the controller collects sensor samples. In at least some embodiments, the controller collects sensor samples from one or more sensors in the vehicle. In at least some embodiments, the controller generates a set of sensor samples. In at least some embodiments, the controller preserves sufficient quality and resolution of the sensor samples for training and testing the vehicle application machine-learning model.

At S886, the controller transmits the output log and sensor samples. In at least some embodiments, the controller transmits the output log and sensor samples to a model updater. In at least some embodiments, this operation sends the collected data to a location. In at least some embodiments, the location is where the data can be analyzed and used to update the vehicle application machine-learning model. In at least some embodiments, the predetermined output is logged, and sensor samples are collected. In at least some embodiments, the output log and sensor samples are sent for further processing.

FIG. 9 is a schematic diagram of a requirement file, according to at least some embodiments of the subject disclosure. Requirement file 923 includes requirement identifier 990, requirement summary 991, training set identifier 992, and metrics 994. In at least some embodiments, requirement file 923 is the document that contains all the information about the requirement, including the requirement identifier, summary, training set identifier, and metrics. In at least some embodiments, requirement file 923 includes structured data formatted in computer readable format, such as YAML format, JSON format, a protocol buffer, a text file, table data, machine-readable data, etc. In at least some embodiments, the requirement file contains compliance requirement details for a specific machine learning model, such as a vehicle application machine-learning model.

Requirement identifier 990 identifies requirement file 923. In at least some embodiments, requirement identifier 990 is a unique code that distinguishes requirement file 923 from other requirement files. In at least some embodiments, requirement identifier 990 is a unique alphanumeric string, such as "XYZ-1234". In at least some embodiments, requirement identifier 990 is suitable as a search key for querying a requirement database.

Requirement summary 991 is a summary of requirement file 923. In at least some embodiments, requirement summary 991 provides a concise description of the user experience requirement in requirement file 923. In at least some embodiments, requirement summary 991 includes background and context of the user experience requirement in requirement file 923. In at least some embodiments, requirement summary 991 is a string of text, such as "Deceleration discomfort avoidance". In at least some embodiments, requirement summary 991 includes a concrete example of one or more user experiences.

Training set identifier 992 identifies training samples. In at least some embodiments, training set identifier 992 is a unique code that identifies a set of training samples used for training an applicable vehicle application machine-learning model to fulfill the user experience requirement of requirement file 923. In at least some embodiments, training set identifier 992 is a unique alphanumeric string, such as "TRAINSET123456", or metadata suitable for querying. In at least some embodiments, training set identifier 992 is a Uniform Resource Locator (URL).

Metrics 994 includes one or more metrics of requirement file 923. Each metric among metrics 994 includes metric type 995, metric criteria 996, and metric condition 997. In at least some embodiments, each metric among metrics 994 specifies a measure used to evaluate fulfillment of a vehicle application machine-learning model with a user experience requirement defined in requirement file 923. In at least some embodiments, metric type 995 represents the type of metric. In at least some embodiments, metric type 995 is one of mean average precision (mAP), F1-score, precision, recall, accuracy, Jaccard, intersection over union (IoU), mean squared error (MSE), mean absolute error (MAE), etc. In at least some embodiments, metric criteria 996 outlines the standards used for the metric. In at least some embodiments, metric criteria 996 is a string or a numerical value, such as ">0.80", "<0.80", "=0.80", ">=0.80", "<=0.80", etc. In at least some embodiments, metric condition 997 specifies a condition for testing the metric. In at least some embodiments, metric condition 997 narrows the scope of training samples used for testing metric criteria 996. In at least some embodiments, metric condition 997 is a string, such as "WEATHER==SUNNY", "TARGET==PASSENGER VEHICLE", "ROAD==HIGHWAY" etc.

Figure 10:
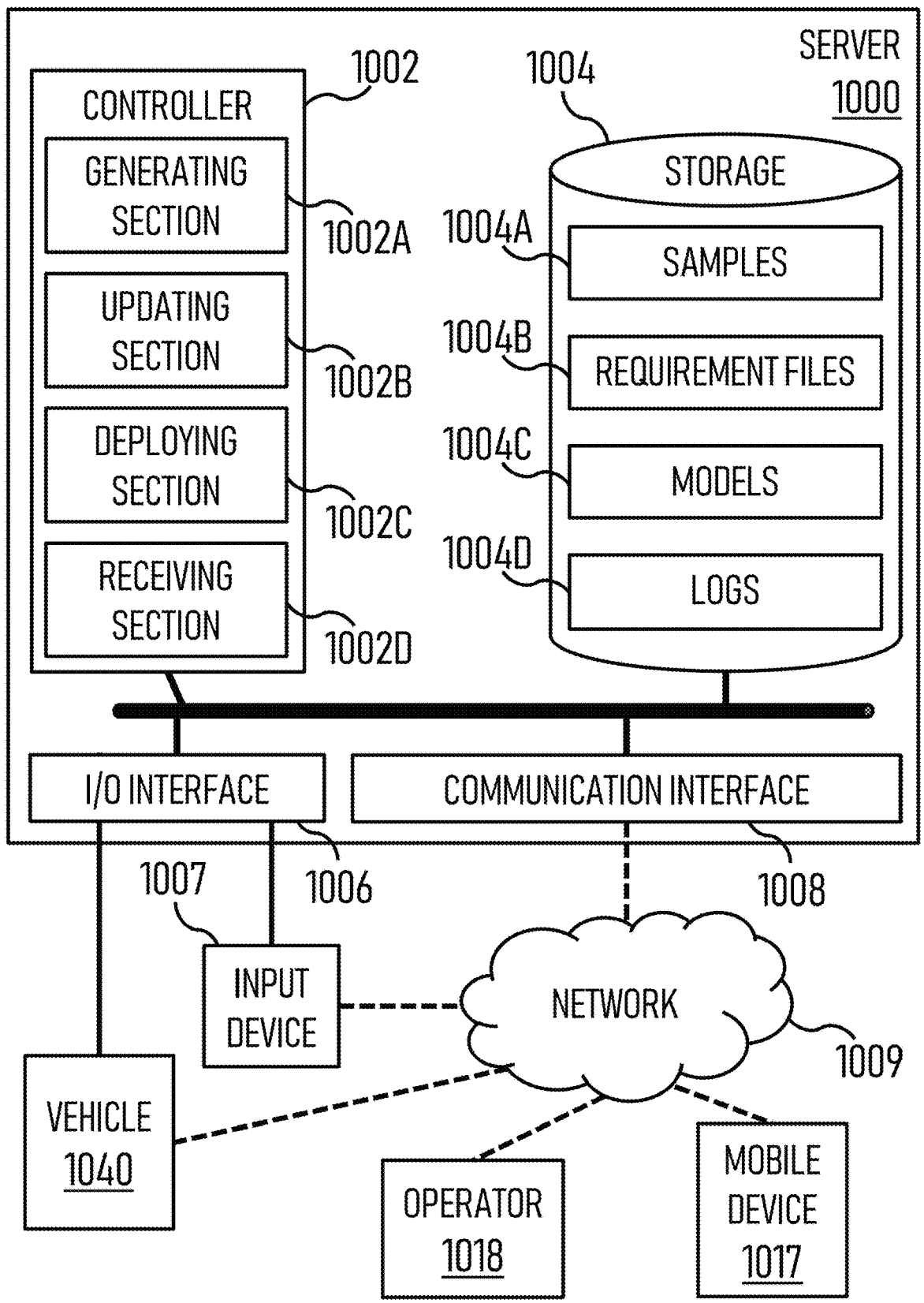
FIG. 10 is a block diagram of a hardware configuration for continuous update of driving system for user experience improvement, according to at least some embodiments of the subject disclosure.

FIG. 10 is a block diagram of a hardware configuration for continuous update of driving system for user experience improvement, according to at least some embodiments of the subject disclosure.

The exemplary hardware configuration includes server 1000, which interacts with input device 1007 and vehicle 1040 directly or through network 1009, and interacts with mobile device 1017 and operator 1018 through network 1009. In at least some embodiments, input device 1007 is a touch screen, a microphone, a camera, or any other device configured to detect tactile, aural, visual, etc. input. In at least some embodiments, network 1009 is an ethernet network, or any other wired or wireless network or a combination thereof. In at least some embodiments, server 1000 is a computer or other computing device that receives input or commands from input device 1007. In at least some embodiments, server 1000 is integrated with input device 1007. In at least some embodiments, server 1000 is a computer system that executes computer-readable instructions to perform operations for continuous update of driving system for user experience improvement.

Server 1000 includes a controller 1002, a storage 1004, an input/output interface 1006, and a communication interface 1008. In at least some embodiments, controller 1002 includes a processor or programmable circuitry executing instructions to cause the processor or programmable circuitry to perform operations according to the instructions. In at least some embodiments, controller 1002 includes analog or digital programmable circuitry, or any combination thereof. In at least some embodiments, controller 1002 includes physically separated storage or circuitry that interacts through communication. In at least some embodiments, storage 1004 includes a non-volatile computer-readable medium capable of storing executable and non-executable data for access by controller 1002 during execution of the instructions. In at least some embodiments, communication interface 1008 transmits and receives data from network 1009. In at least some embodiments, input/output interface 1006 connects to various input and output units, such as input device 1007, via a parallel port, a serial port, a keyboard port, a mouse port, a monitor port, and the like to accept commands and present information. In some embodiments, storage 1004 is external from server 1000.

Controller 1002 includes generating section 1002A, updating section 1002B, deploying section 1002C, and receiving section 1002D. Storage 1004 includes samples 1004A, requirement files 1004B, models 1004C, and logs 1004D.

Generating section 1002A is the circuitry or instructions of controller 1002 configured to generate user experience requirements. In at least some embodiments, generating section 1002A is configured to define, by a requirement defining machine-learning model, a user experience requirement according to user feedback. In at least some embodiments, generating section 1002A utilizes information in storage 1004, such as samples 1004A and models 1004D, and records information in storage 1004, such as requirement files 1004B. In at least some embodiments, generating section 1002A includes sub-sections for performing additional functions, as described in the foregoing flow charts. In at least some embodiments, such sub-sections are referred to by a name associated with a corresponding function.

Updating section 1002B is the circuitry or instructions of controller 1002 configured to update a vehicle application machine-learning model. In at least some embodiments, updating section 1002B is configured to train a vehicle application machine-learning model with a first portion of the plurality of training samples. In at least some embodiments, updating section 1002B utilizes information in storage 1004, such as samples 1004A and requirement files 1004B, and records information in storage 1004, such as models 1004C. In at least some embodiments, updating section 1002B includes sub-sections for performing additional functions, as described in the foregoing flow charts. In at least some embodiments, such sub-sections are referred to by a name associated with a corresponding function.

Deploying section 1002C is the circuitry or instructions of controller 1002 configured to deploy a vehicle application machine-learning model. In at least some embodiments, deploying section 1002C is configured to deploy a vehicle application machine-learning model to a vehicle system in response to determining that the vehicle application machine-learning model fulfills the user experience requirement. In at least some embodiments, updating section 1002B utilizes information in storage 1004, such as models 1004C. In at least some embodiments, deploying section 1002C includes sub-sections for performing additional functions, as described in the foregoing flow charts. In at least some embodiments, such sub-sections are referred to by a name associated with a corresponding function.

Receiving section 1002D is the circuitry or instructions of controller 1002 configured to receive application logs and other output logs. In at least some embodiments, receiving section 1002D is configured to receive an output log of the vehicle application machine-learning model from the vehicle system. In at least some embodiments, receiving section 1002D records information in storage 1004, such as logs 1004D. In at least some embodiments, receiving section 1002D includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, continuous update of driving system for user experience improvement is performed by receiving, through a user interface, a user feedback about a user experience regarding a vehicle system utilizing a vehicle application machine-learning model, and defining, according to the user feedback with a requirement defining machine-learning model, a user experience requirement including a metric type, a metric criterion, and information about the user experience.

In at least some embodiments, continuous update of driving system for user experience improvement further includes preparing a plurality of training samples according to the user experience requirement. In at least some embodiments, the preparing includes defining an annotation rule according to the user experience requirement, labeling a plurality of sensor samples according to the annotation rule, and selecting the training samples from among the plurality of labeled sensor samples. In at least some embodiments, continuous update of driving system for user experience improvement further includes training the vehicle application machine-learning model with a first portion of the plurality of training samples. In at least some embodiments, continuous update of driving system for user experience improvement further includes testing the vehicle application machine-learning model with a second portion of the plurality of training samples according to the user experience requirement. In at least some embodiments, continuous update of driving system for user experience improvement further includes determining whether the vehicle application machine-learning model fulfills the user experience requirement. In at least some embodiments, continuous update of driving system for user experience improvement further includes deploying the vehicle application machine-learning model to the vehicle system in response to determining that the vehicle application machine-learning model fulfills the user experience requirement. In at least some embodiments, continuous update of driving system for user experience improvement further includes receiving an output log of the vehicle application machine-learning model from the vehicle system, analyzing the output log to validate the vehicle application machine-learning model, and updating the user experience requirement according to a result of the analyzing. In at least some embodiments, the preparing includes receiving a sensor data log corresponding to the plurality of sensor samples. In at least some embodiments, the user interface is embedded in the vehicle system. In at least some embodiments, the user interface is embedded in a mobile device of the user. In at least some embodiments, the user interface is configured to communicate with a human operator who communicates with the user. In at least some embodiments, the user experience requirement includes natural language text. In at least some embodiments, continuous update of driving system for user experience improvement further includes storing a chat log of a chat through the user interface about the user experience, wherein the user experience requirement is further defined to include an identifier of the chat log.

In at least some embodiments, continuous update of driving system for user experience improvement is performed by a processor executing instructions in accordance with the foregoing operations or a device comprising a controller including circuitry configured to perform the foregoing operations.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A non-transitory computer-readable medium having instructions recorded thereon that, in response to execution by one or more processors, cause performance of operations comprising:
   receiving, through a user interface, a user feedback about a user experience regarding a vehicle system utilizing a vehicle application machine-learning model;
   defining, according to the user feedback with a requirement defining machine-learning model, a user experience requirement including:
   a metric type,
   a metric criterion, and
   information about the user experience;
   preparing a plurality of training samples according to the user experience requirement by defining an annotation rule according to the user experience requirement, labeling a plurality of sensor samples according to the annotation rule, and
   selecting the plurality of training samples from among the plurality of labeled sensor samples;
   training the vehicle application machine-learning model with a first portion of the plurality of training samples;
   testing the vehicle application machine-learning model with a second portion of the plurality of training samples according to the user experience requirement;
   determining whether the vehicle application machine-learning model fulfills the user experience requirement;
   deploying the vehicle application machine-learning model to the vehicle system in response to determining that the vehicle application machine-learning model fulfills the user experience requirement;
   receiving an output log of the vehicle application machine-learning model from the vehicle system;
   analyzing the output log to validate the vehicle application machine-learning model; and
   updating the user experience requirement according to a result of the analyzing.

2. The computer-readable medium of claim 1, wherein the operations further comprise receiving at least one of a sensor sample and an application log from a vehicle, wherein the user experience requirement is defined further according to the at least one of the sensor sample and the application log.

3. The computer-readable medium of claim 2, wherein the at least one of the sensor sample and the application log is recorded by the vehicle prior to the receiving the user feedback.

4. The computer-readable medium of claim 1, wherein the preparing includes
   receiving a sensor data log corresponding to the plurality of sensor samples.

5. The computer-readable medium of claim 1, wherein the user interface is configured to communicate with a human operator who communicates with the user interface.

6. The computer-readable medium of claim 1, wherein the user experience requirement includes natural language text.

7. A non-transitory computer-readable medium having instructions recorded thereon that, in response to execution by one or more processors, cause performance of operations comprising:
   receiving, through a user interface, a user feedback about a user experience regarding a vehicle system utilizing a vehicle application machine-learning model; and
   defining, according to the user feedback with a requirement defining machine-learning model, a user experience requirement including:

a metric type,
a metric criterion, and
information about the user experience;
storing a chat log of a chat through the user interface about the user experience;
preparing a plurality of training samples according to the user experience requirement; and
training the vehicle application machine-learning model with a first portion of the plurality of training samples,
wherein the user experience requirement is further defined to include an identifier of the chat log.

8. A method comprising:
receiving, through a user interface, a user feedback about a user experience regarding a vehicle system utilizing a vehicle application machine-learning model;
defining, according to the user feedback with a requirement defining machine-learning model, a user experience requirement including:
a metric type,
a metric criterion, and
information about the user experience;
preparing a plurality of training samples according to the user experience requirement by defining an annotation rule according to the user experience requirement, labeling a plurality of sensor samples according to the annotation rule, and
selecting the plurality of training samples from among the plurality of labeled sensor samples;
training the vehicle application machine-learning model with a first portion of the plurality of training samples;
testing the vehicle application machine-learning model with a second portion of the plurality of training samples according to the user experience requirement;
determining whether the vehicle application machine-learning model fulfills the user experience requirement;
deploying the vehicle application machine-learning model to the vehicle system in response to determining that the vehicle application machine-learning model fulfills the user experience requirement;
receiving an output log of the vehicle application machine-learning model from the vehicle system;
analyzing the output log to validate the vehicle application machine-learning model; and
updating the user experience requirement according to a result of the analyzing.

9. A device comprising:
a controller including circuitry configured to perform operations including:
receiving, through a user interface, a user feedback about a user experience regarding a vehicle system utilizing a vehicle application machine-learning model,
defining, according to the user feedback with a requirement defining machine-learning model, a user experience requirement including:
a metric type,
a metric criterion, and
information about the user experience,
preparing a plurality of training samples according to the user experience requirement by
defining an annotation rule according to the user experience requirement,
labeling a plurality of sensor samples according to the annotation rule, and
selecting the plurality of training samples from among the plurality of labeled sensor samples,
training the vehicle application machine-learning model with a first portion of the plurality of training samples,
testing the vehicle application machine-learning model with a second portion of the plurality of training samples according to the user experience requirement,
determining whether the vehicle application machine-learning model fulfills the user experience requirement,
deploying the vehicle application machine-learning model to the vehicle system in response to determining that the vehicle application machine-learning model fulfills the user experience requirement,
receiving an output log of the vehicle application machine-learning model from the vehicle system,
analyzing the output log to validate the vehicle application machine-learning model, and
updating the user experience requirement according to a result of the analyzing.

* * * * *